United States Patent
Xiang

(10) Patent No.: US 10,946,885 B2
(45) Date of Patent: Mar. 16, 2021

(54) MULTI-FUNCTION PET STROLLER

(71) Applicant: Yuanzhen Xiang, La Canada, CA (US)

(72) Inventor: Yuanzhen Xiang, La Canada, CA (US)

(*) Notice: Subject to any disclaimer, the term of this patent is extended or adjusted under 35 U.S.C. 154(b) by 388 days.

(21) Appl. No.: 16/007,975

(22) Filed: Jun. 13, 2018

(65) Prior Publication Data
US 2019/0002007 A1 Jan. 3, 2019

Related U.S. Application Data

(60) Provisional application No. 62/555,615, filed on Sep. 7, 2017.

(51) Int. Cl.
| | | |
|---|---|---|
| *A01K 1/02* | (2006.01) | |
| *B62B 9/12* | (2006.01) | |
| *B62B 9/14* | (2006.01) | |
| *B62B 9/20* | (2006.01) | |
| *B62B 9/26* | (2006.01) | |

(52) U.S. Cl.
CPC .............. *B62B 9/12* (2013.01); *A01K 1/0254* (2013.01); *B62B 9/14* (2013.01); *B62B 9/203* (2013.01); *B62B 9/26* (2013.01); *B62B 2202/42* (2013.01); *B62B 2204/00* (2013.01); *B62B 2206/04* (2013.01)

(58) Field of Classification Search
CPC ...... A01K 1/0254; A01K 1/0236; B62B 9/12; B62B 9/14; B62B 9/203; B62B 9/26; B62B 2206/04; B62B 2202/42; B62B 9/142; B62B 9/145
See application file for complete search history.

(56) References Cited

U.S. PATENT DOCUMENTS

| | | | | |
|---|---|---|---|---|
| 4,796,565 A | * | 1/1989 | Charbeneau | A01K 1/0236 119/727 |
| 5,113,793 A | * | 5/1992 | Leader | A01K 1/0245 119/453 |
| 6,374,775 B1 | * | 4/2002 | Baumsteiger | A01K 1/0236 119/496 |
| 6,584,937 B1 | * | 7/2003 | Ludolph | A01K 1/0236 119/453 |
| 6,786,181 B1 | * | 9/2004 | Leanheart | A01K 1/0236 119/453 |
| 6,866,008 B1 | * | 3/2005 | Havard | A01K 1/0236 119/496 |

(Continued)

*Primary Examiner* — Trinh T Nguyen
(74) *Attorney, Agent, or Firm* — Raymond Y. Chan; David and Raymond Patent Firm

(57) ABSTRACT

A pet stroller includes a frame body. The frame body includes two rear wheel struts, two front wheel struts pivotally coupled with the two rear wheel struts respectively, a U-shaped handle frame coupled on the two rear wheel struts respectively, and a supporting frame assembly operatively connected with the two front and rear wheel struts. The supporting frame assembly includes an folding frame operatively cooperated with the U-shaped handle frame and the rear wheel struts, an upper supporting frame coupled on the folding frame, a plurality of canopy bars pivotally coupled with the folding frame, and a platform frame pivotally coupled with the folding frame, wherein a carriage body is supported by the frame body to provide a resting cavity for accommodating the animals and a canopy body is adapted to cover and enclose the resting cavity of the carriage body.

20 Claims, 8 Drawing Sheets

(56) References Cited

U.S. PATENT DOCUMENTS

| | | | |
|---|---|---|---|
| 6,913,271 B2* | 7/2005 | Gordon | A01K 1/0236 119/453 |
| 7,261,060 B1* | 8/2007 | Garofola | A01K 1/0236 119/482 |
| 10,517,265 B2* | 12/2019 | Lin | B62B 3/02 |
| 2006/0169218 A1* | 8/2006 | Chang | A01K 1/0254 119/496 |
| 2006/0284392 A1* | 12/2006 | Chen | A01K 1/0236 280/47.38 |

* cited by examiner

MULTI-FUNCTION PET STROLLER

CROSS REFERENCE OF RELATED APPLICATION

This is a non-provisional application that claims the benefit of priority under 35U.S.C. § 120 to a provisional application, application No. 62/555,615, filed Sep. 7, 2017. The afore-mentioned patent application is hereby incorporated by reference in its entirety.

NOTICE OF COPYRIGHT

A portion of the disclosure of this patent document contains material which is in subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention related to a pet stroller, and more particularly to a multi-function pet stroller which not only provides an easy-to-latch canopy, but also provide an adjustable carriage portion to accommodate variable sizes of animals.

Description of Related Arts

A conventional pet stroller comprises a frame body, and a cloth and mesh coupled on the frame body to provide a carriage for accommodate the animals and a convertible canopy for providing a shade to the animals. However, the convertible pet stroller has several drawbacks.

The canopy having a mesh which is adapted to connect with an upper periphery of the carriage to confine the animal inside the carriage without having to be tied or clipped by a lead. In other words, the mesh is zipped, clipped, or buckled to the upper periphery of the carriage, and can be moved between an opened and closed position. In addition, the mesh also can be attached on the carriage by loop and hook fastener (Velcro) or magnetic member. However, the user need to spend time to clip or buckle the mesh to confine the animals inside the carriage, and at the same time the animals may usually jump or climb for getting out of the carriage, so it is hassle for the user to fasten the mesh with the carriage. In other words, when the clips, buckles, Velcro, and magnetic members are broken after constantly use, the user needs to purchase additional accessories to replace them.

Secondly, the conventional pet stroller doesn't provide a ventilation device. Even if the mesh is a ventilation material, the canopy is usually required to close to prevent the animals trying to getting out of the carriage, so the temperature inside the carriage is always very high during summer time. Therefore, the ventilation devices, such as air condition or electronic fans, are highly desired to install inside the carriage.

Thirdly, the space of the carriage of the conventional pet stroller is fixed. The pet stroller for a small size animal generally does not fit to carry a large size animal. Although a large size pet stroller is convenient for accommodating both small and large sizes of animals, it is bulky too. In addition, it is not enough space for using the conventional pet stroller in a narrow way or alley, and especially the conventional pet stroller is required to turn around.

Fourthly, rear wheel assembly of the conventional pet stroller usually comprises two rear wheels and one rear wheel axis assembly, and the rear wheel assembly is coupled with through a plurality of steps. In other words, additional supplemental tools are required to detach and attach the rear wheels. Therefore, not only the user needs to spend lot of time to assemble or disassemble the rear wheels, but also the rear wheels and the rear wheel axis assembly are easy to be broken during the installation.

SUMMARY OF THE PRESENT INVENTION

The invention is advantageous in that it provides a pet stroller having a canopy body which is able to easily latch relative to the carriage body without any latching mechanism, such as clips, buttons, zippers, or belts.

Another advantage of the invention is to provide a pet stroller, wherein the pet stroller comprises a frame body having an upper supporting frame and a plurality of canopy bars having sizes slightly larger than that of the upper supporting frame, wherein the canopy body comprises an enclosure portion coupled on one of the canopy bars, so that the enclosure portion is able to cover on the upper supporting frame.

Another advantage of the invention is to provide a pet stroller, wherein the pet stroller comprises a U-shaped handle frame which is able to operate between a forward position and a rearward position, so the pet stroller can provide a two-way pet stroller to allow the animals resting on the pet stroller for facing or backing onto the user.

Another advantage of the invention is to provide a pet stroller, wherein the pet stroller comprises a platform frame for supporting the platform enclosure to form a receiving cavity, wherein the platform frame comprises a U-shaped pivotal frame that can be placed into a different angle position relative to an folding frame, so as to provide different sizes of resting cavity.

Another advantage of the invention is to provide a pet stroller, wherein the platform frame comprises an actuation member operatively associated with the U-shaped pivotal frame to lock and unlock the U-shaped pivotal frame relative to the folding frame. Therefore, the actuation member is pulled to activate a movement of the U-shaped pivotal frame.

Another advantage of the invention is to provide a pet stroller, wherein its platform enclosure and the resting cavity can be enlarged by the U-shaped pivotal frame that can be adjustable to in length.

Another advantage of the invention is to provide a pet stroller, wherein the pet stroller comprises two locking assemblies on each sides of the U-shaped handle frame to lock the U-shaped handle frame in the forward position and the rearward position.

Another advantage of the invention is to provide a pet stroller, wherein each of the two locking assemblies comprises a slide actuator slidably attached along the U-shaped handle frame, and a lock member operatively lined with the slide actuator to selectively lock the U-shaped handle frame in the forward position and the rearward position.

Another advantage of the invention is to provide a pet stroller, wherein the pet stroller comprises two detachable front wheels detachably coupled to two front struts and a rear wheel assembly detachably coupled to two rear struts, so the fronts wheels and the rear wheels can be easily detach and attach on the pet stroller without complicated processes.

Another advantage of the invention is to provide a pet stroller, wherein the pet stroller comprises a ventilation device deposited inside the resting cavity for maintaining a comfortable temperature there inside.

Additional advantages and features of the invention will become apparent from the description which follows, and may be realized by means of the instrumentalities and combinations particular point out in the appended claims.

According to the present invention, the foregoing and other objects and advantages are attained by a pet stroller, comprising:

a frame body comprising two rear wheel struts, two front wheel struts pivotally coupled with the two rear wheel struts respectively, a U-shaped handle frame having two ends pivotally coupled on the two rear wheel struts respectively, and a supporting frame assembly operatively connected with the two front and rear wheel struts, wherein the supporting frame assembly comprises an folding frame operatively cooperated with the U-shaped handle frame and the rear wheel struts, an upper supporting frame transversely and pivotally coupled on the folding frame, a plurality of canopy bars pivotally coupled with the folding frame, and a platform frame pivotally coupled with the folding frame, wherein a size of each of the canopy bar is larger than that of the upper supporting frame;

a carriage body supported by the folding frame, the upper supporting frame, and the platform frame to provide a resting cavity for accommodating the animals; and a canopy body integrally extended from the carriage body and supported by said supporting frame, wherein the canopy body comprises a cloth portion, a mesh portion, and an enclosure portion coupled with one of the canopy bar to cover on said upper supporting frame.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
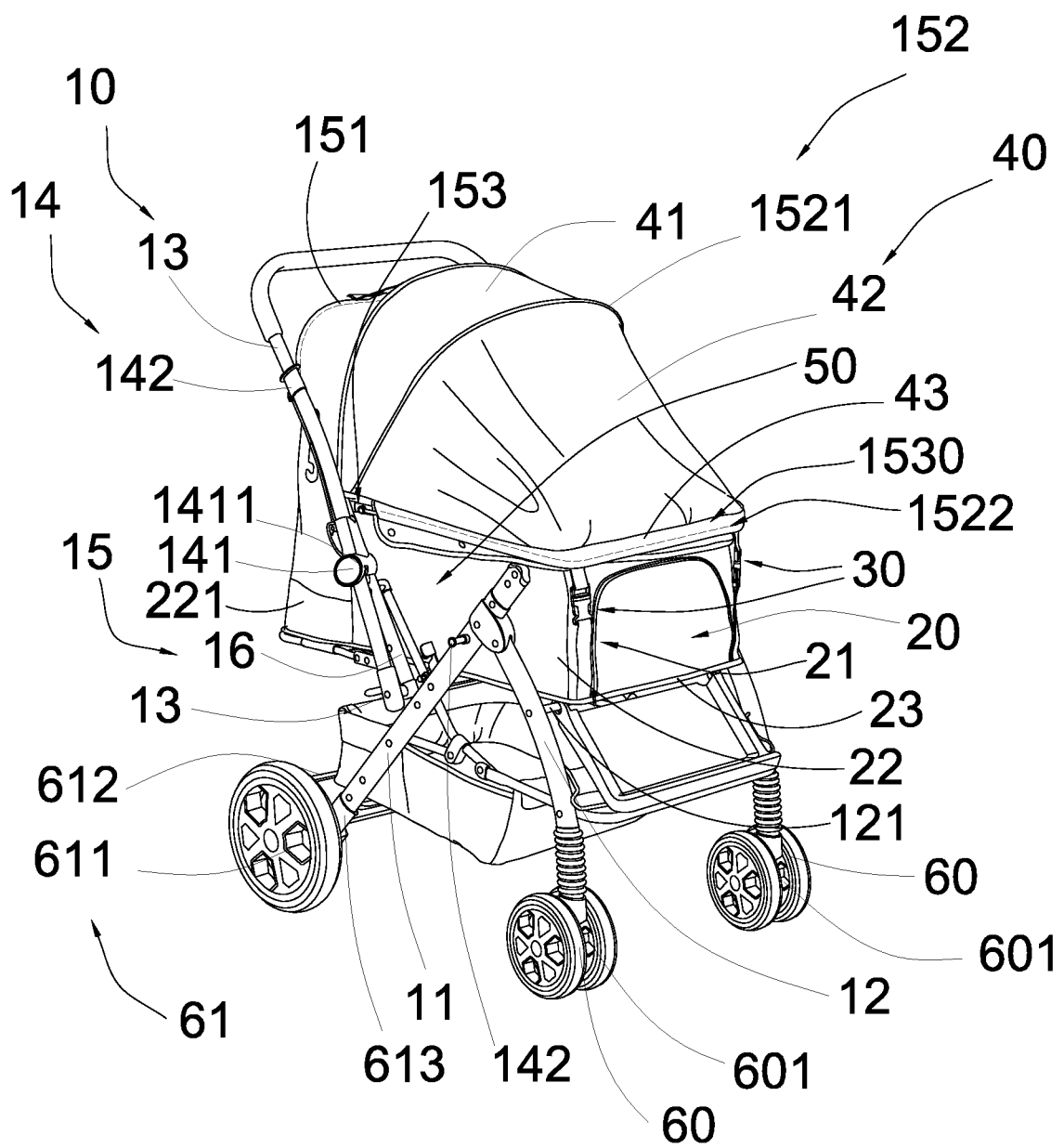
FIG. 1 is a perspective view of a pet stroller according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 4 of the drawings, a pet stroller according to a preferred embodiment of the present invention is illustrated, wherein the pet stroller comprises a frame body 10, a front and a rear wheel assembly 60, 61 detachably coupled with the frame body 10, a carriage body 20 supported by the frame body 10 for accommodating at least an animal therein, and a canopy body 40 supported by the frame body 10 to cover the carriage body 20 and confine the animal inside the carriage body 20.

Accordingly, the frame body 10 comprises two rear wheel struts 11, two front wheel struts 12 pivotally coupled with the two rear wheel struts 11 respectively, a handle frame 13 having a U-shape and two free ends pivotally attached on the two rear wheel struts 11 respectively by two strut pivots 13, two locking assemblies 14 operatively located at the handle frame 13 to activate the handle frame 13 to move between a forward position and a rearward position, and a supporting frame assembly 15 operatively connected with the two front and rear wheel struts 11, 12 to support the carriage body 20 to form a resting cavity 21.

The supporting frame assembly 15 comprises a U-shaped folding frame 16 pivotally associated with the handle frame 13 and the rear wheel struts 11 by a folding and unfolding mechanism 50 on either side of the handle frame 13 and each of the two rear wheel struts 11, wherein the folding and unfolding mechanism 50 can be operated to move the frame body 10 to operate between a folding position and an unfolding position.

According to the preferred embodiment of the present invention, each of the two locking assemblies 14 comprises a pair of locker member 141 slidably arranged on the U-shaped handle frame 13, and a pair of rear protrusions 142 and front protrusions 143 formed on the folding frames 16 and the two rear wheel struts 11 respectively to selectively engage with the locker member 141, wherein each of the locker members 141 comprises a front locking groove 1411 and a rear locking groove 1412 formed on a bottom portion of the locker member 141. Each of the two locking assemblies 14 further comprises a slide actuator 142 slidably attached on the folding frame 16, a wire 143, and a spring 144 deposited inside the locker member 141, wherein the slide actuator 142 is operatively linked with the locker member 141 respectively through the wire 143. In other words, one end of the wire 143 is connected with the slide actuator 142, and the other end of each of the wire 143 is connected with the spring 144.

It is worth mentioning that the locker member 141 is driven to move along the folding frame 16 via the slide actuators 142. When the slide actuator 142 is upwardly pulled along with the folding frame 16 as well as the spring 144 is extended by a pulling force provided by the slide actuators 142, the locker member 141 is synchronously moving towards the slide actuator 142. On the other hand, when the slide actuator 142 is not activated, which is that no pulling force is exerted thereon, the spring 144 reinstates to its original shapes, and then the locker member 141 is driven to return at its original position, and at the same time, the slide actuator 142 synchronously and downwardly moves along the folding frame 16 to reach its original position.

Since the U-shaped handle frame 13 is operated between the forward position and the rearward position, the rear protrusion 143 is engaged with the rear locking groove 1412 of the locker member 141 in order to lock the U-shaped handle frame 13 in the forward position. Therefore, the slide actuator 142 is upwardly pulled to drive the locker member 141 for moving upwardly along the folding frame 16 in order to disengage the connection between the rear protrusion 143 and the rear locking groove 1412. In other words, the front protrusion 142 is engaged with the front locking groove 1411 of the locker member 141 in order to lock the U-shaped handle frame 16 in the rearward position. Therefore, the slide actuator 142 is upwardly pulled to drive the locker member 141 for moving upwardly along the folding frame 16 in order to disengage the connection between the front protrusion 142 and the front locking groove 1411.

The pet stroller further comprises two detachable front wheels 60 and a detachable rear wheel assembly 61, wherein each of the front wheels 60 comprises a press button 601 operatively associated with a free end of said front wheel strut 12. Each of the front wheels 60 further comprises an elongated slot 602 for engaging with the free end of the front wheel strut 12 to affix the front wheel 60 with the front wheel strut 12, wherein the press button 601 is able to press for releasing the front wheel 60 from the front wheel strut 12, and press for attaching the front wheel 60 with the front wheel strut 12. In other words, the rear wheel assembly 61 also can be detachably connected with each of a free end of the rear wheel strut 11, wherein the rear wheel assembly 61 comprises two rear wheels 611 associated with each other through a supporting frame 612, wherein the supporting frame 612 comprises two vertically arranged sleeves 613 adapted for engaging with the free end of the rear wheel strut 11. Therefore, the free ends of the two rear wheel struts 11 are coupled with the sleeves 613 to affix the rear wheel assembly 61 with the rear wheel strut 11.

The pet stroller is able to operate between a compact storage position and an extended position, wherein the press bar 521 is pressed to activate the pet stroller for performing the compact storage position. After the press bar 521 is pressed, the folding and unfolding mechanism is slid downwardly along the rear wheel strut 11, and then the folding frame 16 and the U-shaped handle frame 13 are moved to overlap with the rear wheel strut 11, and at the same time, the front wheel strut 12 is pivotally moved towards the rear wheel strut 11 for overlapping with the rear wheel strut 11. In order to open the pet stroller in the extended position, the U-shaped handle frame 13 is lifted upwardly, and then the press bar 521 can be pressed to locate the folding and unfolding mechanism in a position where the folding frame 16 and the U-shaped handle frame 13 are overlapped with each other, and at the same position, the hook-shaped locker 53 can be engaged with the retainer 522 to affix the pet stroller in the extended position. Therefore, the pet stroller of the present invention has an easy to fold and unfold structure. In other words, the press bar 521 is adapted to guide the pet stroller to perform a compact storage position and the extended position, so the user only need to easily press the press bar 521 in order to guide the configuration of the pet stroller in the compact storage position or the extended position.

The supporting frame assembly 15 further comprises an upper supporting frame 151, which is a top U-shaped portion of the folding frame transversely extended between two lower members of folding frame 16, and supported by the rear wheel strut 11, a platform frame 153 and a canopy frame 152. The platform frame 153 comprises a carriage supporting member having a U-shape and two ends rigidly connected to the folding frame 16 and extended frontwardly to support the carriage body 20 and an extension frame 1531 which is pivotally connected to the folding frame 16 and operatively linked with the folding and unfolding mechanism 50.

The canopy frame 152 comprises one or more C-shaped upper canopy bars 1521 and a U-shaped lower canopy enclosure bar 1522, pivotally associated with the folding frame 16 and the upper supporting frame 151 respectively, wherein the upper canopy bar 1521 and the lower canopy enclosure bar 1522 are pivotally connected to the folding frame 16, in such a manner that both of the one or more upper canopy bars 1521 and the lower canopy enclosure bar 1522 are operated to pivotally move between the carriage supporting member 1530 and the upper supporting frame 151, that is to be operated to move towards the upper supporting frame 151 or selectively move towards the lower canopy enclosure bar 1522.

The folding and unfolding mechanism 50 comprises a pair of main bases 51 each having a serrated slot 511 and attached on the folding frame 16, and a pair of pivot members 52 each having a middle portion pivotally connected with the folding frame 16. Each of the pivot members 52 further comprises a press bar 521 extended through one side of the respective pivot member 52 to the other side thereof. Since each of the pivot members 52 is pivotally connected with the inclined member 16, the press bar 521 can be downwardly pressed to move the pivot member 52 relative to the folding frame 16. The folding and unfolding mechanism 50 further comprises a hook-shaped locker 53 attached on each of the rear wheel struts 11, wherein the hook-shaped locker 53 is pivotally connected with the rear wheel struts 11 to selectively engage with a retainer 522 of the pivot member 52 for locking the pivot member 52 in an affixed position. Therefore, while the pivot member 52 is locked in the affixed position, the folding frame 16, the rear wheel struts 11, and the front wheel struts 12 are synchronously locked in the unfolding position. In that unfolding position, the rear wheel struts 11 and the front wheel struts 12 are biased against a ground to support the pet stroller standing thereon.

Figure 3:
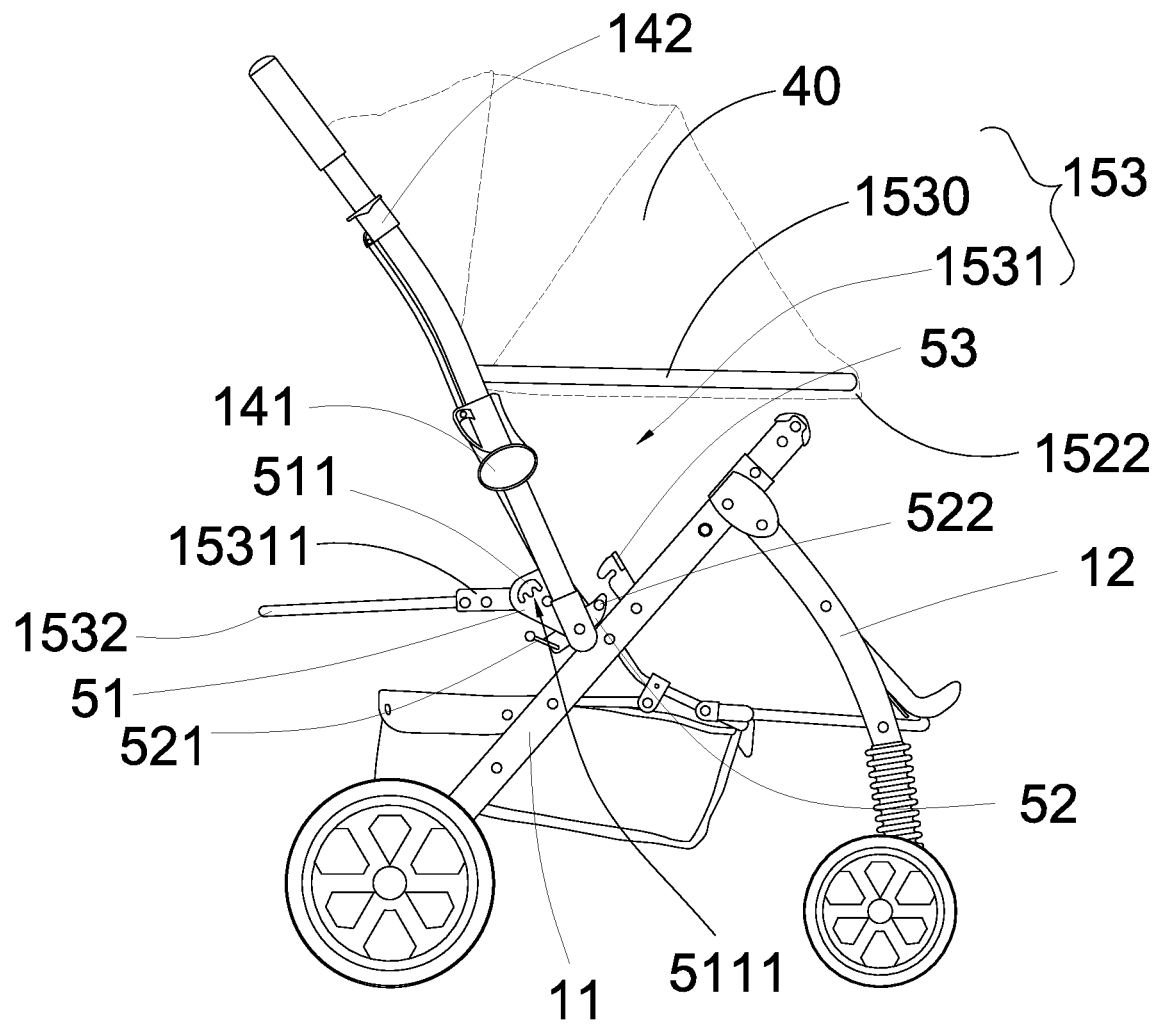
FIG. 3 is a side schematic view illustrating the frame body of the pet stroller according to the above preferred embodiment of the present invention.
Figure 4:
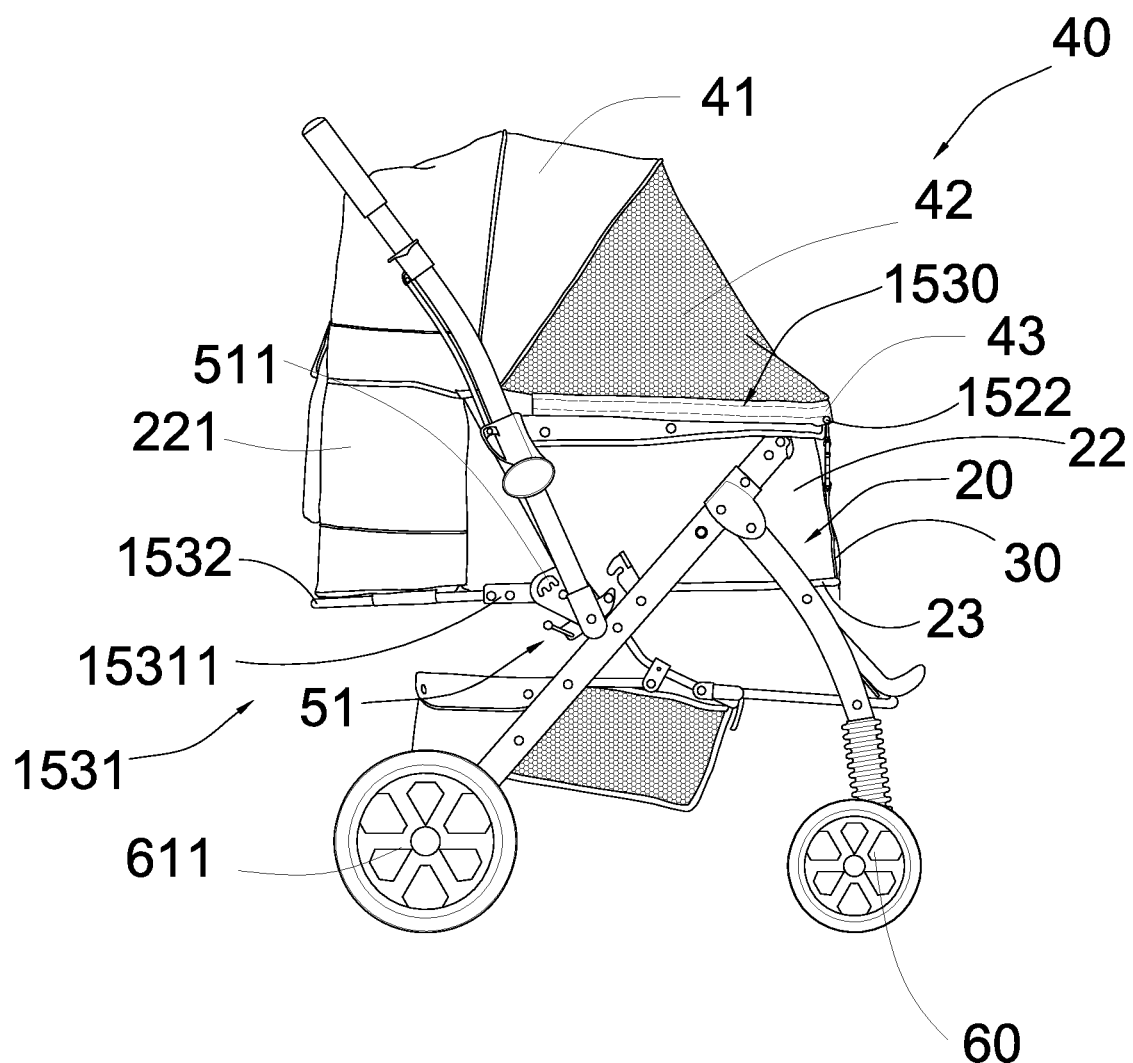
FIG. 4 is a side view of the pet stroller according to the above preferred embodiment of the present invention.

Accordingly, the canopy body 40 comprises a ceiling portion 41, which can be made of clothing material such as woven or non-woven textile, detachably coupled to the folding frame 16 and supported by the upper supporting frame 151 and the one or more upper canopy bars 1521. The canopy body 40 further comprises a front portion 42 integrally extended from the ceiling portion 41 to the lower canopy enclosure bar 1522, wherein the front portion 42 can be made of clothing material as shown in FIG. 1 or mesh material as shown in FIG. 4 for air ventilation. Alternatively, the entire canopy body 40 can be all cloth or all mesh. In addition, the canopy body 40 further has an enclosure portion 43 integrally extended from the front portion 42 with the lower canopy enclosure bar 1522 being covered and enclosed therein. In other words, the one or more upper canopy bars 1521 are received in the canopy body 40 and the lower canopy enclosure bar 1522 is received in the enclosure portion for retracting or extending the canopy body 40 between a retracted position where the lower canopy enclosure bar 1522 and the one or more upper canopy bars 1521 are moving towards and resting at the upper supporting frame 151 (as shown in FIG. 2) or an extended position where the lower canopy enclosure bar 1522 is moving towards and engaging with the carriage supporting member 1530 (as shown in FIGS. 1, 3 and 4).

It is worth mentioning that the lower canopy enclosure bar 1522 is received in the enclosure portion 43, and a size of the U-shaped lower canopy enclosure bar 1522 is slightly larger than a size of the U-shaped upper supporting frame 151. Accordingly, when the lower canopy enclosure bar 1522 received in the enclosure portion 43 is moved toward the carriage supporting member 1530 to extend the canopy body 40 to cover the resting cavity 21 of the carriage body 20, as shown in FIGS. 1 and 4, the lower canopy enclosure bar 1522 can be further moved downward over the carriage supporting member 1530 until the enclosure portion 42 of the canopy body 40 and the lower canopy enclosure bar 1522 therein are positioned below the carriage supporting member 1530, so that the lower canopy enclosure bar 1522 and the carriage supporting member 1530 are engaged to lock the extended position of the canopy body 40 in position for preventing the animal in the resting cavity from coming out.

In other words, according to the preferred embodiment of the present invention, the lower canopy enclosure bar 1522 is arranged to be able to shut up canopy body 40 with the carriage body 20 and to enclose the resting cavity 21 by the canopy body 40. In order to further ensure the enclosure of the resting cavity 21, the pet stroller of the present invention further comprises a locking mechanism 30, as shown in FIGS. 1, 2 and 4, which comprises at least one first member 31 connected to a front edge of the enclosure portion 43 of the canopy body 40 a second member 32 connected to a front side of the platform enclosure 22, and connector 33 detachably connected between the first and second members 31, 32. The connector 33 can be embodied as a buckle device having a male buckle and a female buckle connected to the first and second members 31, 32 respectively so that when the male and female buckles are buckled together the canopy body 40 is further fastened with the carriage body 20.

Figure 2:
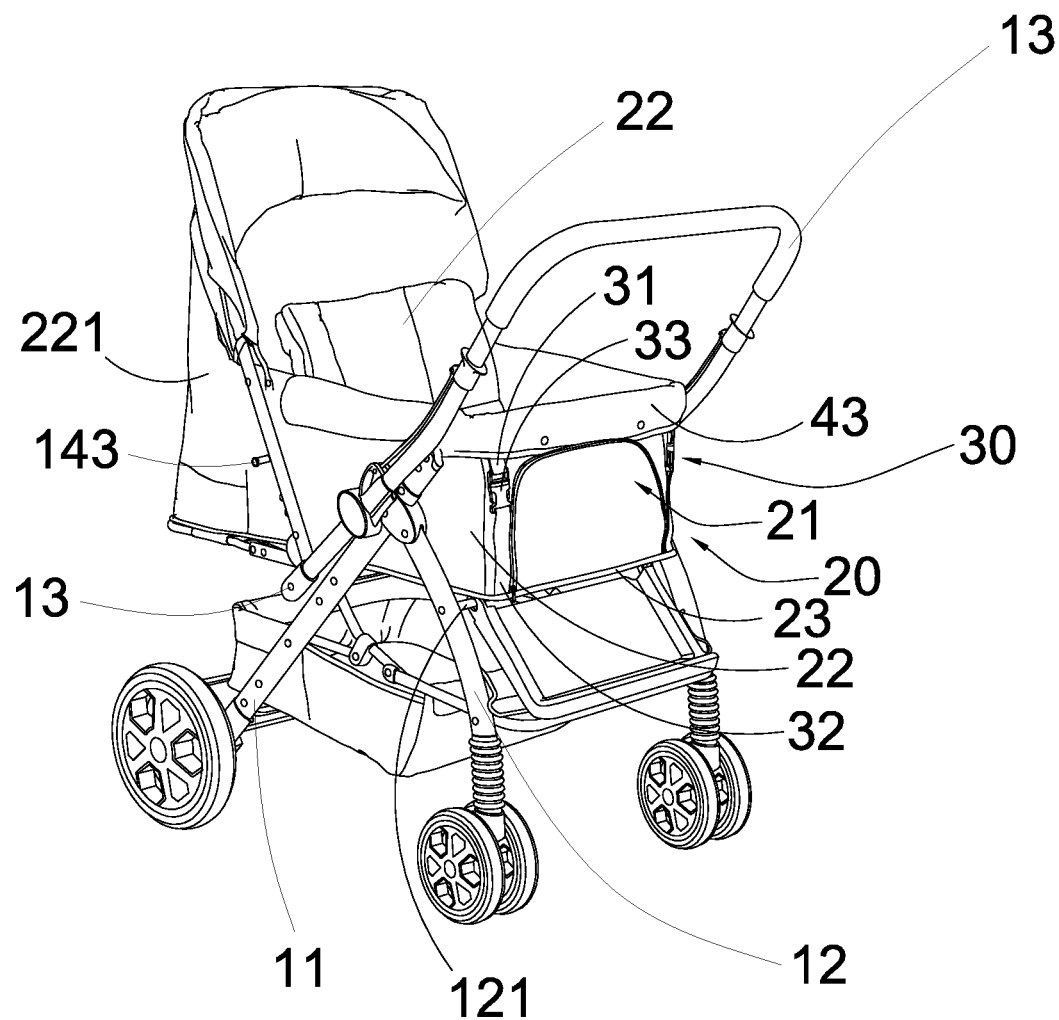
FIG. 2 is a schematic view of the pet stroller according to the above preferred embodiment of the present invention, illustrating that a canopy body is on a retracted position.

Referring to FIGS. 1 and 2 of the drawings, a base bar 121 is connected between the two front wheel struts 12 to form a bottom support to the carriage body 20. Referring to FIGS. 1, 2 and 4, the carriage body 20 comprises a platform enclosure 22 having an upper portion supported by the carriage supporting member 1530 to integrally and downwardly extend from the carriage supporting member 1530 and a base panel 23 provided at a bottom of the platform enclosure 22 which is supported by the base bar 121 to define the resting cavity 21 within the platform enclosure 22 and on top of the base panel 23 where one or more animals can stay therein. The canopy body 40 is a shield to confine the animal inside the resting cavity 21 while the canopy body 40 is in the extended position. It is worth mentioning that the base board 22 is adapted to provide a rigid platform to the animal for resting thereon and the carriage body 20 can be made of woven or non-woven textile, wherein the carriage body 20 is folded while the frame body 10 is in the folding position. And, in other words, the carriage body 20 is unfolded along with the base panel 23 forming the platform, while the frame body 10 is in the unfolding position.

The extension frame 1531 of the platform frame 153 comprises a base member 15311, a U-shaped pivotal frame 1532 transversely extended from the base member 15311, and an actuator member 15312, such that the base member 15311 is arranged to be selectively engaged within one of the locking recesses 5111 of the serrated slot 511 defined in the main base 51, in form of W shape, by means of the actuator member 15312. The actuator member 15312 is arranged to be capable of activating the base member 15311 to selectively engage with the main base 51 so as to fold up the pivotal frame 1532 towards the folding frame 16 to a folding position or to unfold the pivotal frame 1532 downwards to a horizontal unfolding position. According to the preferred embodiment, the actuator member 15312 is able to activate the base member 15311 to move arcuately in the serrated slot 511, so that the U-shaped pivotal frame 1532 can be placed into a different angular position inclined relative to the folding frame 16 or a horizontal position as shown in FIGS. 1 to 4 so as to extend the carriage body 20 rearwardly to further enlarge the resting cavity 21 of the carriage body 20.

Figure 5:
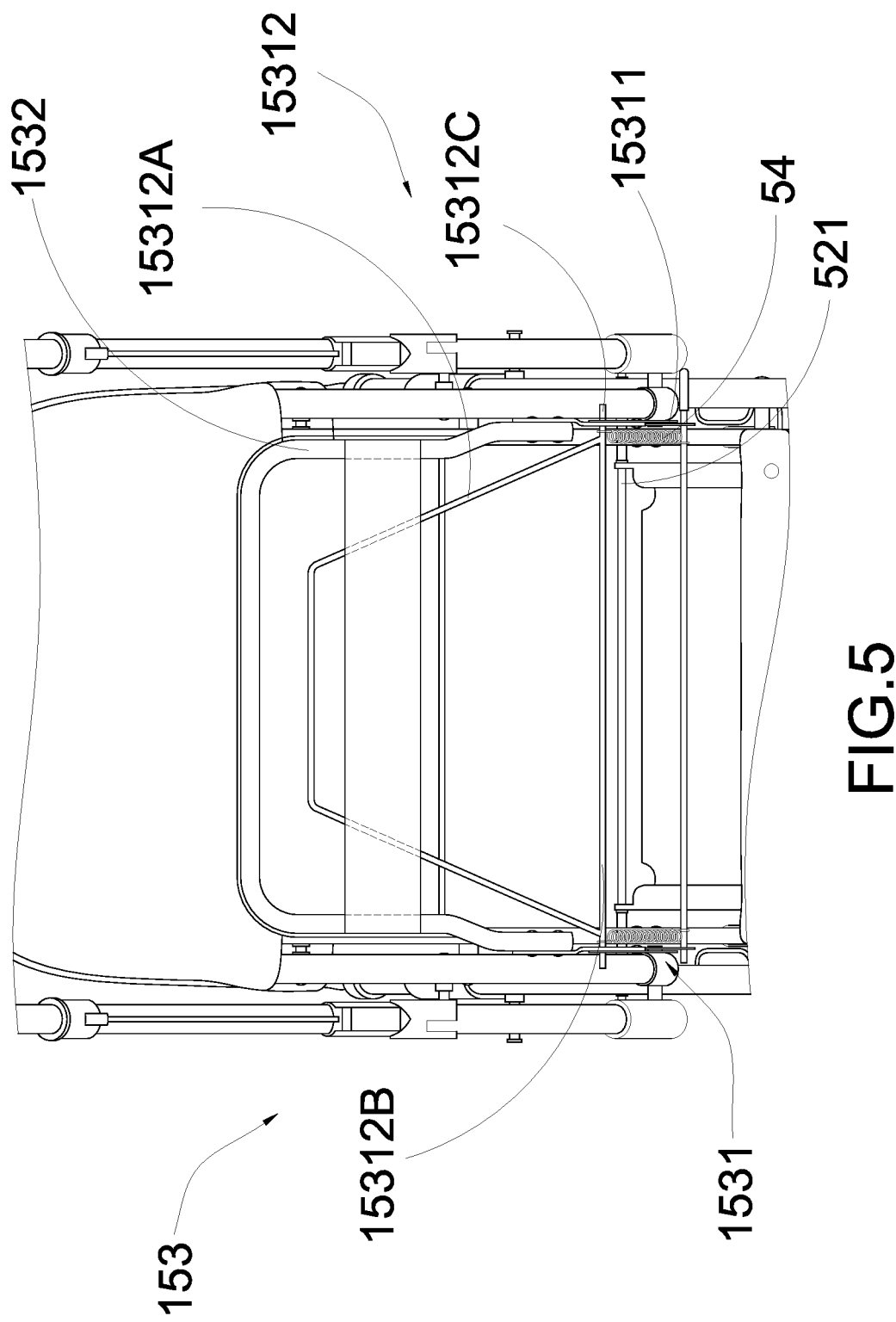
FIG. 5 is a rear view of the pet stroller according to the above preferred embodiment of the present invention.
Figure 6A:
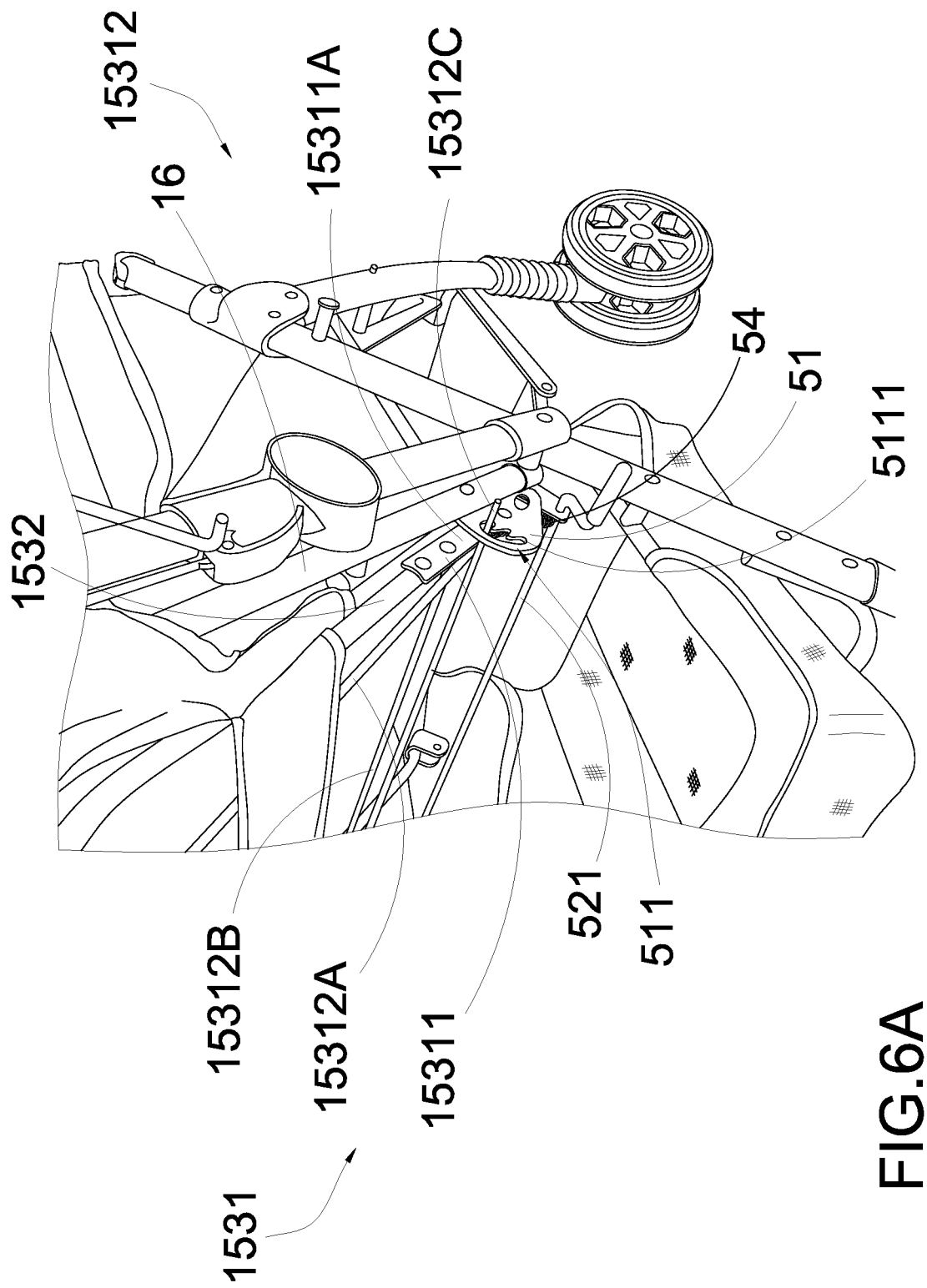
FIG. 6A is a schematic view illustrating the pivotal frame of the pet stroller in folded position according to the above preferred embodiment of the present invention.
Figure 6B:
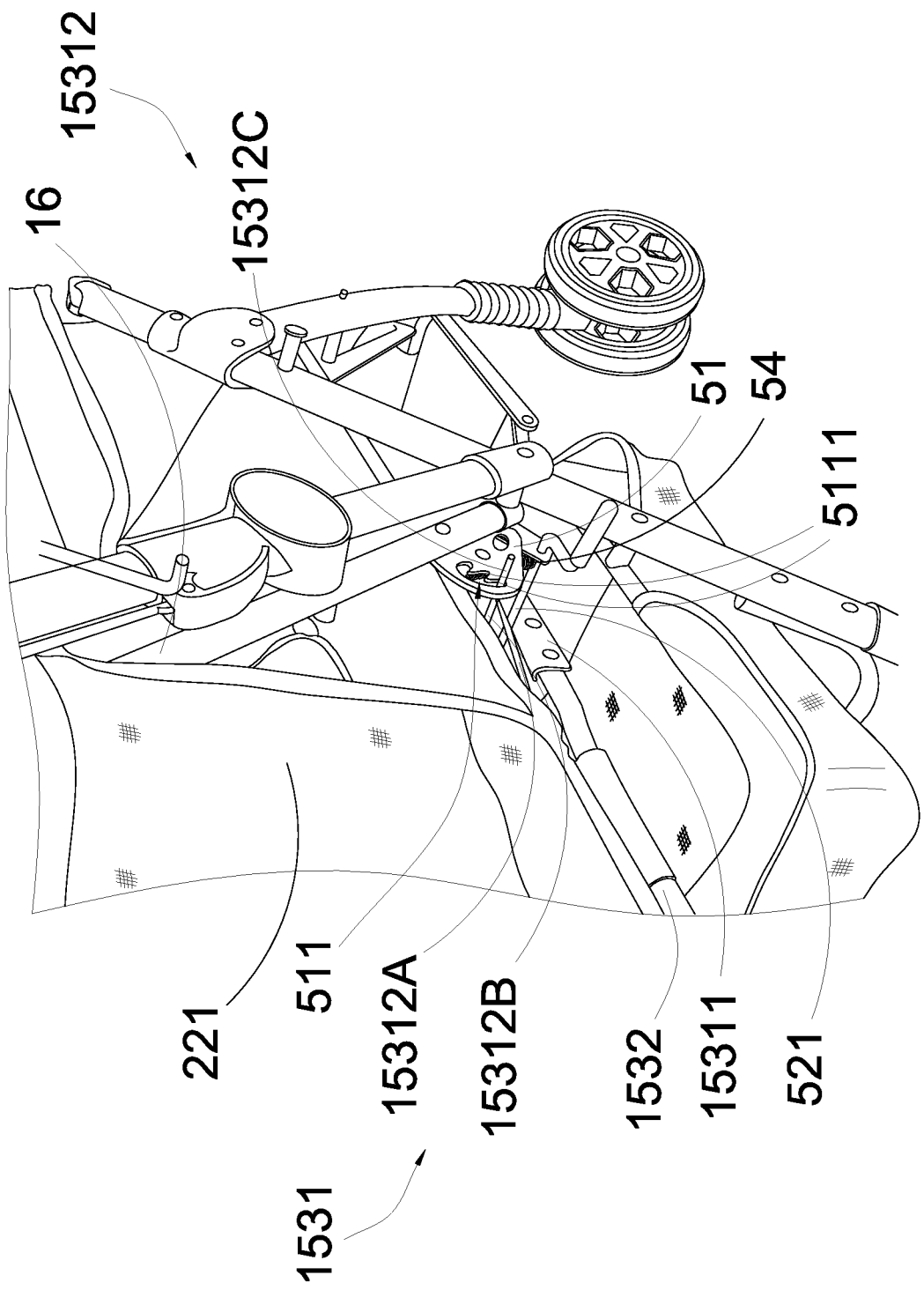
FIG. 6B is a schematic view illustrating the pivotal frame of the pet stroller in unfolded position according to the above preferred embodiment of the present invention.

In addition, referring to FIGS. 5, 6A and 6B, the platform frame 153 further comprises an actuator member 15312 comprising a U-shape actuator bar 15312A and an engaging bar 15312B having two engaging arms 15312C provided at two ends thereof and horizontally and outwardly extended from two ends of the actuator bar 15312A to penetrate through two guiding slots 15311A formed in the base members 15311 respectively so as to couple with the two main bases 51 by extending through the serrated slot 511 and selectively engaging with one of the locking recesses 5111.

The folding and unfolding mechanism 50 further comprises a pair of tension springs 54 coupled between the press bar 521 and the actuator member 15312 as well as the base member 15311. When the actuator bar 15312A of the actuator member 15312 is pulled away from the press bar 521 upwardly, the engaging arms 15312C are disengaged with the locking recesses 5111 and able to move along the serrated slots 511 of the main bases 51 respectively. If each of the engaging arms 15312C is selected to engage with the upper locking recess 5111 of the serrated slot 511 of the respective main base 51, as shown in FIG. 6A, the extension frame 1531 is folded towards the folding frame 16 to fold up a rear platform enclosure 221 of the carriage body 20 which is mounted to the pivotal frame 1532, i.e. the folding position. If each of the engaging arms 15312C is selected to engage with the lower locking recess 5111 of the serrated slot 511 of the respective main base 51, as shown in FIG. 6B, the extension frame 1531 is unfolded to the horizontal unfolding position so as to unfold the rear platform enclosure 221 to enlarge the interior room of the resting cavity 21 of the carriage body 20, as shown in FIGS. 1, 2, 4, and 6B.

In other words, the tension springs 54 function to provide a reinstating force to pull and maintain the engaging arms 15312C being engaged in the selected locking recesses 5111 so as to retain the base member 15311 and the pivotal frame 1532 of the extension frame 1531 in position. To release such reinstating force, the user may simply pull the actuator bar 15312A upwardly away from the press bar 521 as mentioned above.

Since the platform enclosure 22 is supported by platform frame 153 to form the resting cavity 21 therein and the rear platform enclosure 221 is supported by the pivotal frame 1532 in unfolded position, the pivotal frame 1532 can be unfolded and placed into a maximum angular position relative to the folding frame 16 to provide a maximum room of the resting cavity 21 for larger animal. In the other words, when the pivotal frame 1532 is overlapped with the folding frame 16, which means that the pivotal frame 1532 is folded and placed into a minimum angular position relative to the folding frame 16, the resting cavity 21 is reduced to have a smaller room for smaller animal. Therefore, the pet stroller of the present invention is able to provide at least two sizes of resting cavity 21 for allowing the animals to stay therein.

Figure 7:
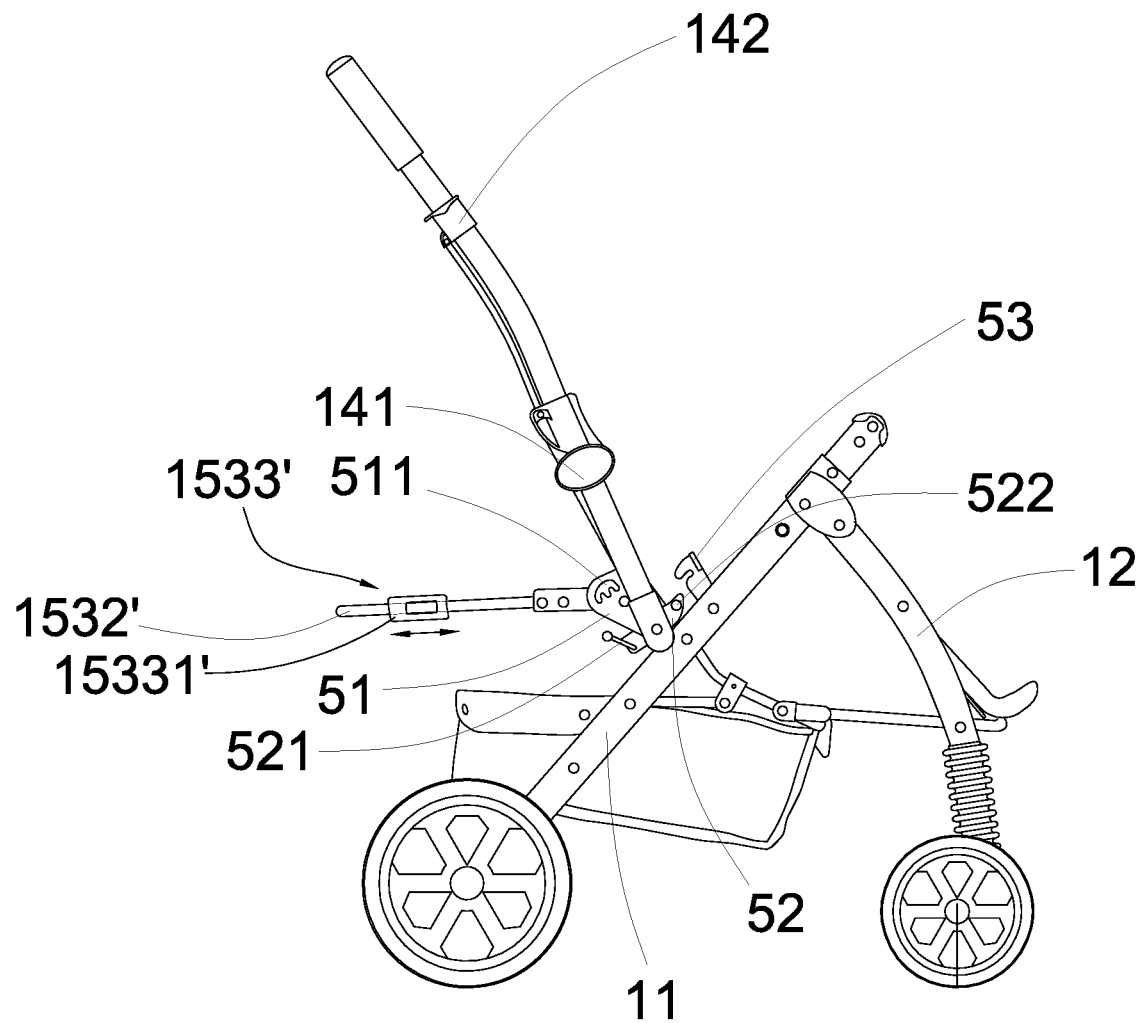
FIG. 7 is side schematic view illustrating the frame body of an alternative mode of the above preferred embodiment of the present invention.

Referring to FIG. 7, an alternative mode of the U-shaped pivotal frame 1532' is illustrated, wherein two extensible devices 1533' is provided at two side bars of the U-shaped pivotal frame 1532'. Each of the extensible devices 1533' can be embodied to comprise holding sleeve 15331' having a threaded through hole to enable the end portion of the pivotal frame 1532' screwed therein, so that by rotating the holding sleeve 15331' clockwise or anticlockwise, the pivotal frame 1532' can be extended outwardly or inwardly to further enlarge or reduce the supporting area of the rear platform enclosure 221 respectively.

It is worth mentioning that the pet stroller may further comprises a ventilation device for maintaining the resting cavity in a comfortable temperature, wherein the ventilation device can be an air condition or an electric fan which can be powered by electric power. In addition, the electric power can be generated by different kinds of power source, such as batteries or solar energy system, wherein the solar energy system can be arranged on the canopy body for exposing under the sun.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pet stroller, comprising:
a carriage body having a platform enclosure;
a canopy body;
a frame body which comprises a handle frame, a supporting frame assembly, a front wheel assembly, a rear wheel assembly, an folding frame pivotally associated with said handle frame, said front wheel assembly and said rear wheel assembly, and a folding and unfolding mechanism adapted to be operated to selectively fold said handle frame, said front wheel assembly, said rear wheel assembly, and said supporting frame assembly into a folded position, or unfolded said handle frame, said front wheel assembly, said rear wheel assembly, and said supporting frame assembly into a unfolded position to support said carriage body to define a resting cavity therein, wherein said supporting frame assembly comprises an upper supporting frame, which is a top portion of said folding frame, a platform frame supporting said carriage body, and a canopy frame supporting said canopy body, wherein said platform frame comprises a carriage supporting member extended frontwardly from said folding frame to support said platform enclosure of said carriage body and define said resting cavity within said platform enclosure of said carriage body, wherein said canopy frame comprises at least a lower canopy enclosure bar pivotally associated with said folding frame and said canopy body having one end portion connected with an upper supporting frame and another end portion connected with said lower canopy enclosure bar, wherein said lower canopy enclosure bar is operated to pivotally move between said carriage supporting member and said upper supporting frame, wherein when said lower canopy enclosure bar is moved towards said upper supporting frame, said canopy body is in a retracted position and said resting cavity is communicated with outside, wherein when said lower canopy enclosure bar is moved towards and engaged with carriage supporting member, said canopy body is in an extended position that said resting cavity is covered by said canopy body.

2. The pet stroller, as recited in claim 1, wherein said lower canopy enclosure bar has a size slight larger than a size of said carriage supporting member, wherein during said canopy body is in said extended position, said lower canopy enclosure bar is moved downward over said carriage supporting member until said lower canopy enclosure bar is positioned below said carriage supporting member such that said lower canopy enclosure bar and said carriage supporting member are engaged to lock said extended position of said canopy body in position.

3. The pet stroller, as recited in claim 2, further comprising a locking mechanism which comprises a first member connected to said canopy body, a second member connected to said carriage body and a connector detachably connected between said first and second members to fasten said canopy body with said carriage body so as to further lock up engagement of said lower canopy enclosure bar and said carriage supporting member and retain said extended position of said canopy body.

4. The pet stroller, as recited in claim 1, wherein said carriage body further has a rear platform enclosure and said platform frame further comprises an extension frame which is pivotally connected to said folding frame and operatively linked with said folding and unfolding mechanism to support said rear platform enclosure of said carriage body.

5. The pet stroller, as recited in claim 4, wherein at least a main base is provided at said folding frame and said extension frame comprises a base member, a pivotal frame transversely extended from said base member and an actuator member, wherein said actuator member is arranged to be capable of activating said base member to selectively engage with said main base so as to selectively fold up said pivotal frame towards said folding frame to a folding position or unfold said pivotal frame downwards to an unfolding position to unfold said rear platform enclosure to enlarge said resting cavity of said carriage body.

6. The pet stroller, as recited in claim 5, wherein said main base has a serrated slot having two or more locking recesses, wherein said actuator member comprises a U-shape actuator bar and an engaging bar having at least one engaging arm provided at one end thereof and horizontally and outwardly extended from one end of said actuator bar to penetrate through a guiding slot formed in said base member so as to couple with said main base by extending through said serrated slot and selectively engaging with one of said locking recesses.

7. The pet stroller, as recited in claim 6, wherein said folding and unfolding mechanism further comprises at least a tension spring coupled between a press bar provided at a lower portion of said folding frame and said actuator member, wherein when said actuator bar of said actuator member is pulled away from said press bar upwardly, said engaging arm is disengaged with said locking recesses and able to move along said serrated slot of said main base, wherein said tension spring provides a reinstating force to pull and maintain said engaging arm being engaged in said locking recess selected so as to retain said base member and said pivotal frame of said extension frame in position, wherein said reinstating force is released by pulling said actuator bar upwardly away from said press bar.

8. The pet stroller, as recited in claim 2, wherein said carriage body further has a rear platform enclosure and said platform frame further comprises an extension frame which is pivotally connected to said folding frame and operatively linked with said folding and unfolding mechanism to support said rear platform enclosure of said carriage body.

9. The pet stroller, as recited in claim 8, wherein at least a main base is provided at said folding frame and said extension frame comprises a base member, a pivotal frame transversely extended from said base member and an actuator member, wherein said actuator member is arranged to be capable of activating said base member to selectively engage with said main base so as to selectively fold up said pivotal frame towards said folding frame to a folding position or unfold said pivotal frame downwards to an unfolding position to unfold said rear platform enclosure to enlarge said resting cavity of said carriage body.

10. The pet stroller, as recited in claim 9, wherein said main base has a serrated slot having two or more locking recesses, wherein said actuator member comprises a U-shape actuator bar and an engaging bar having at least one engaging arm provided at one end thereof and horizontally and outwardly extended from one end of said actuator bar to penetrate through a guiding slot formed in said base member so as to couple with said main base by extending through said serrated slot and selectively engaging with one of said locking recesses.

11. The pet stroller, as recited in claim 10, wherein said folding and unfolding mechanism further comprises at least a tension spring coupled between a press bar provided at a lower portion of said folding frame and said actuator member, wherein when said actuator bar of said actuator member is pulled away from said press bar upwardly, said engaging arm is disengaged with said locking recesses and able to move along said serrated slot of said main base, wherein said tension spring provides a reinstating force to pull and maintain said engaging arm being engaged in said locking recess selected so as to retain said base member and said pivotal frame of said extension frame in position, wherein said reinstating force is released by pulling said actuator bar upwardly away from said press bar.

12. The pet stroller, as recited in claim 3, wherein said carriage body further has a rear platform enclosure and said platform frame further comprises an extension frame which is pivotally connected to said folding frame and operatively linked with said folding and unfolding mechanism to support said rear platform enclosure of said carriage body.

13. The pet stroller, as recited in claim 12, wherein at least a main base is provided at said folding frame and said extension frame comprises a base member, a pivotal frame transversely extended from said base member and an actuator member, wherein said actuator member is arranged to be capable of activating said base member to selectively engage with said main base so as to selectively fold up said pivotal frame towards said folding frame to a folding position or unfold said pivotal frame downwards to an unfolding position to unfold said rear platform enclosure to enlarge said resting cavity of said carriage body.

14. The pet stroller, as recited in claim 13, wherein said main base has a serrated slot having two or more locking recesses, wherein said actuator member comprises a U-shape actuator bar and an engaging bar having at least one engaging arm provided at one end thereof and horizontally and outwardly extended from one end of said actuator bar to penetrate through a guiding slot formed in said base member so as to couple with said main base by extending through said serrated slot and selectively engaging with one of said locking recesses.

15. The pet stroller, as recited in claim 14, wherein said folding and unfolding mechanism further comprises at least a tension spring coupled between a press bar provided at a lower portion of said folding frame and said actuator member, wherein when said actuator bar of said actuator member is pulled away from said press bar upwardly, said engaging arm is disengaged with said locking recesses and able to move along said serrated slot of said main base, wherein said tension spring provides a reinstating force to pull and maintain said engaging arm being engaged in said locking recess selected so as to retain said base member and said pivotal frame of said extension frame in position, wherein said reinstating force is released by pulling said actuator bar upwardly away from said press bar.

16. The pet stroller, as recited in claim 1, wherein said canopy body has an enclosure portion integrally extended from a front portion thereof and said lower canopy enclosure bar is covered and enclosed therein.

17. The pet stroller, as recited in claim 2, wherein said canopy body has an enclosure portion integrally extended from a front portion thereof and said lower canopy enclosure bar is covered and enclosed therein.

18. The pet stroller, as recited in claim 3, wherein said canopy body has an enclosure portion integrally extended from a front portion thereof and said lower canopy enclosure bar is covered and enclosed therein.

19. The pet stroller, as recited in claim 11, wherein said canopy body has an enclosure portion integrally extended from a front portion thereof and said lower canopy enclosure bar is covered and enclosed therein, wherein said first member is connected to said enclosure portion.

20. The pet stroller, as recited in claim 15, wherein said canopy body has an enclosure portion integrally extended from a front portion thereof and said lower canopy enclosure bar is covered and enclosed therein, wherein said first member is connected to said enclosure portion.

* * * * *